(12) United States Patent
Cullen

(10) Patent No.: US 11,028,578 B2
(45) Date of Patent: Jun. 8, 2021

(54) INSULATION PANELS WITH PERFORATED FACERS

(71) Applicant: Bernard Ted Cullen, Winnipeg (CA)

(72) Inventor: Bernard Ted Cullen, Winnipeg (CA)

(73) Assignee: Quik-Therm Insulation Solutions Inc., Winnipeg (CA)

( * ) Notice: Subject to any disclaimer, the term of this patent is extended or adjusted under 35 U.S.C. 154(b) by 0 days.

(21) Appl. No.: 16/743,151

(22) Filed: Jan. 15, 2020

(65) Prior Publication Data

US 2020/0232208 A1   Jul. 23, 2020

Related U.S. Application Data

(60) Provisional application No. 62/795,465, filed on Jan. 22, 2019.

(51) Int. Cl.
*E04B 1/76* (2006.01)
*B32B 5/18* (2006.01)
*E04C 2/20* (2006.01)

(52) U.S. Cl.
CPC ............ *E04B 1/762* (2013.01); *B32B 5/18* (2013.01); *E04C 2/205* (2013.01)

(58) Field of Classification Search
CPC ... E04B 1/762; E04B 1/80; E04B 1/10; E04C 2/205; E04C 2/523; E04C 2002/004
See application file for complete search history.

(56) References Cited

U.S. PATENT DOCUMENTS

| | | | | |
|---|---|---|---|---|
| 3,041,219 A | * | 6/1962 | Steck | E04B 1/80 428/138 |
| 3,097,124 A | * | 7/1963 | Denenberg | E04B 1/80 428/138 |
| 4,196,242 A | * | 4/1980 | McLaren | B32B 3/266 428/138 |
| 4,227,356 A | * | 10/1980 | Stern | B32B 3/28 52/309.4 |
| 4,326,909 A | * | 4/1982 | Slavik | B26F 1/24 156/253 |
| 4,351,873 A | * | 9/1982 | Davis | B32B 11/02 428/198 |
| 4,784,891 A | * | 11/1988 | Shickel | B32B 3/00 428/137 |
| 4,902,550 A | * | 2/1990 | Shickel | B32B 5/22 428/137 |
| 5,776,579 A | * | 7/1998 | Jessup | B32B 3/12 428/73 |

(Continued)

*Primary Examiner* — Rodney Mintz
(74) *Attorney, Agent, or Firm* — Kyle R Satterthwaite; Michael R Williams; Ade & Company Inc.

(57) ABSTRACT

An exterior insulation panel for installation in an exterior building envelope of a building. The insulation panel has an interior face for facing toward an interior space of the building, an exterior face lying opposite the interior face for facing away from the interior space of the building, and a foam core laminated with a perforated exterior facer on one or both faces of the panel, at which the exterior facer defines an uncovered outermost layer of the panel. Each perforated facer comprises openings therein through which moisture is migratable into the foam core during moisture-rich environmental conditions, for temporary holding of the excess moisture until such conditions subside.

15 Claims, 4 Drawing Sheets

(56) References Cited

U.S. PATENT DOCUMENTS

| | | | | |
|---|---|---|---|---|
| 5,938,875 | A * | 8/1999 | Jessup | B32B 3/12 |
| | | | | 156/79 |
| 6,800,352 | B1 * | 10/2004 | Hejna | B27N 3/04 |
| | | | | 428/131 |
| 7,378,044 | B1 * | 5/2008 | Hejna | B27N 3/04 |
| | | | | 156/252 |
| 7,784,236 | B2 * | 8/2010 | Barr | B32B 15/14 |
| | | | | 52/454 |
| 9,163,397 | B2 * | 10/2015 | Willson | B32B 5/18 |
| 9,694,897 | B2 * | 7/2017 | Pero, III | B29C 44/02 |
| 2007/0259155 | A1 * | 11/2007 | Zupon | B32B 27/36 |
| | | | | 428/131 |
| 2009/0098357 | A1 * | 4/2009 | Bergtold | B32B 27/20 |
| | | | | 428/218 |
| 2012/0021172 | A1 * | 1/2012 | Willson | B32B 17/061 |
| | | | | 428/131 |
| 2016/0273212 | A1 * | 9/2016 | Pero, III | B29C 44/02 |
| 2020/0002938 | A1 * | 1/2020 | Buck | E04B 9/045 |
| 2020/0055275 | A1 * | 2/2020 | Yao | B32B 5/022 |

\* cited by examiner

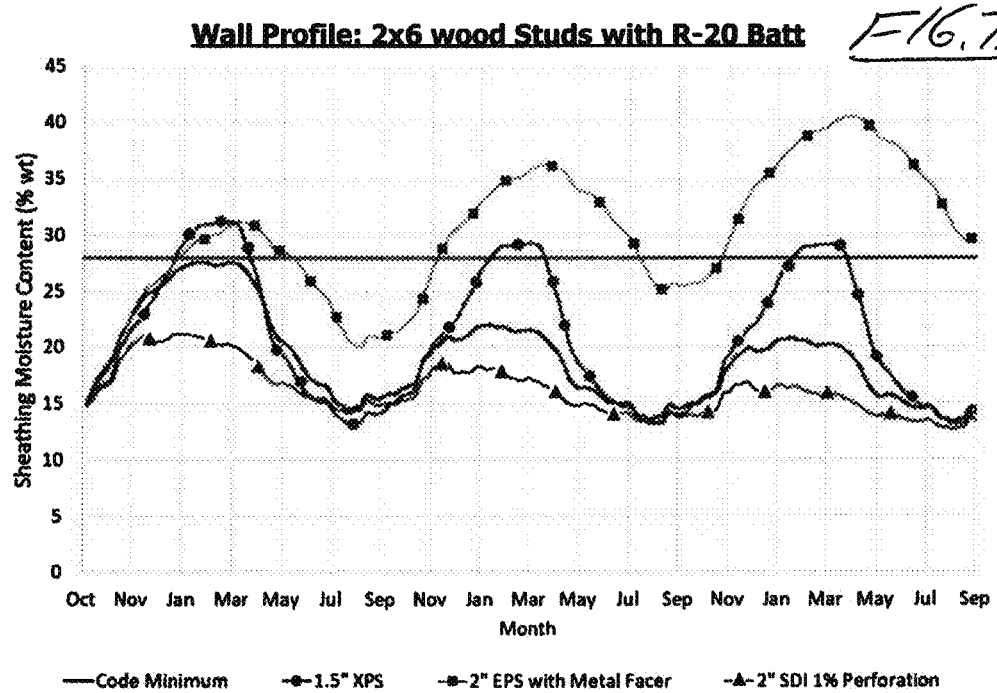
7-day plywood sheathing moisture content at mid-height for east facing split insulated wall assembly subject to 0.15% (max 0.02 L/h/m²) driving rain penetration without air leakage in Vancouver
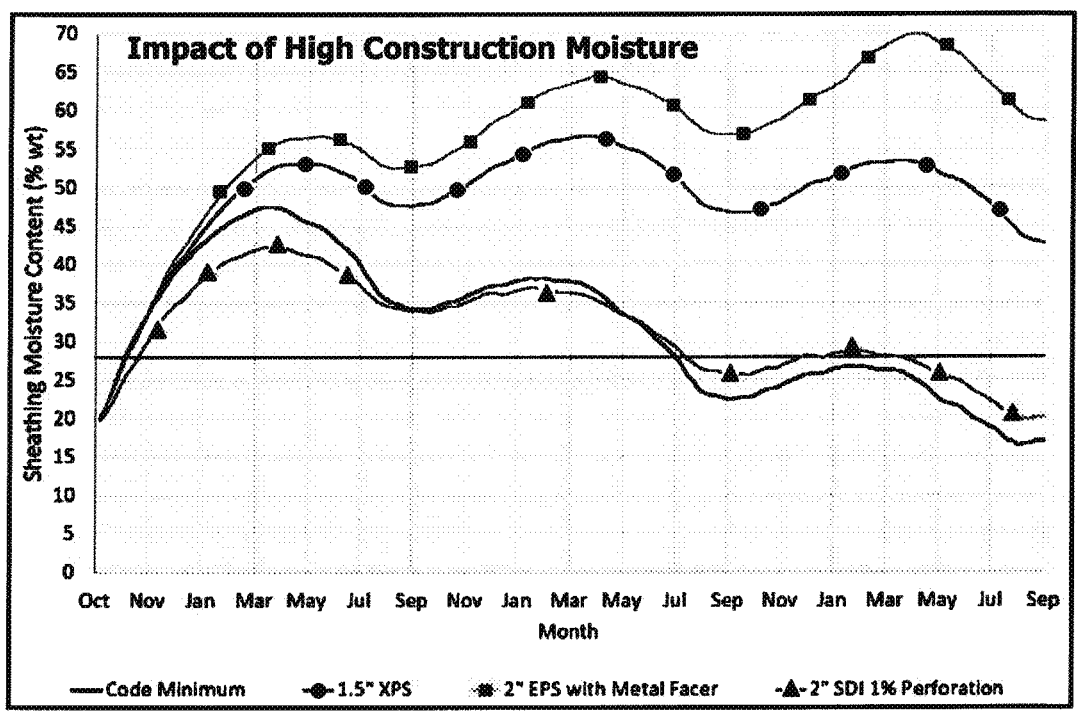

INSULATION PANELS WITH PERFORATED FACERS

CROSS-REFERENCE TO RELATED APPLICATIONS

This application claims benefit under 35 U.S.C. 119(e) of U.S. Provisional Application No. 62/795,465, filed Jan. 22, 2019, and U.S. Provisional Application No. 62/931,718, filed Nov. 6, 2019, each of which is incorporated herein by reference in its entirety.

FIELD OF THE INVENTION

The present invention relates generally to insulation panels used in assembly of exterior building envelopes, and more particularly to exterior insulation panels featuring foam cores with laminated facers thereon.

BACKGROUND

Exterior insulation panels of the general forgoing type are known in the art, including those in which a foam core is laminated on both sides thereof with a metalized polymer film to create heat-reflective, and moisture impermeable facers on both sides of the panel to minimize heat transfer and moisture migration across the finished wall structure.

However, there remains room for improvement, and Applicant has developed a unique insulation panel for improved management of high-moisture conditions.

SUMMARY OF THE INVENTION

According to one aspect of the invention, there is provided an exterior insulation panel for installation in an exterior building envelope of a building, the insulation panel having an interior face for facing toward an interior space of the building in an installed position in the building envelope, an exterior face lying opposite the interior face for facing away from of the interior space of the building in the installed position in the building envelope, and a foam core laminated with a perforated exterior facer at the exterior face of the panel, wherein said exterior facer defines an uncovered outermost layer of the panel at said exterior face thereof.

According to another aspect of the invention, there is provided an exterior insulation panel for installation in an exterior envelope of a building, the insulation panel having an interior face for facing toward an interior space of the building in an installed position in the building envelope, an exterior face lying opposite the interior face for facing away from the interior space of the building in the installed position in the building envelope, and a foam core laminated with a perforated exterior facer at the exterior face of the panel, wherein said exterior perforated facer comprises openings therein through which moisture is migratable to the foam core.

According to another aspect of the invention, there is provided an exterior insulation panel for installation in an exterior building envelope of a building, the insulation panel having an interior face for facing toward an interior space of the building in an installed position in the building envelope, an exterior face lying opposite the interior face for facing away from the interior space of the building in the installed position in the building envelope, and a foam core laminated with perforated interior and exterior facers at the interior and exterior faces of the panel, respectively.

According to another aspect of the invention, there is provided a method of using the insulation panel of any preceding aspect of the invention in a finished building envelope, said method comprising, during moisture-rich environmental conditions, using perforations in the perforated facer(s) to admit migration of some moisture from an air cavity and/or drainage space of the finished building envelope into the foam core for temporary holding of said migrated moisture within said foam core.

BRIEF DESCRIPTION OF THE DRAWINGS

One embodiment of the invention will now be described in conjunction with the accompanying drawings in which:

FIG. 7A shows computer modeled results for sheathing moisture content of a finished exterior wall over the span of a year using perforated-facer insulation panels of the present invention versus other insulation panels.

FIG. 7B is a similar plot to FIG. 7A, and illustrates use of the perforated-facer insulation panels to better mitigate of the impact of high construction moisture.

DETAILED DESCRIPTION

Figure 1:
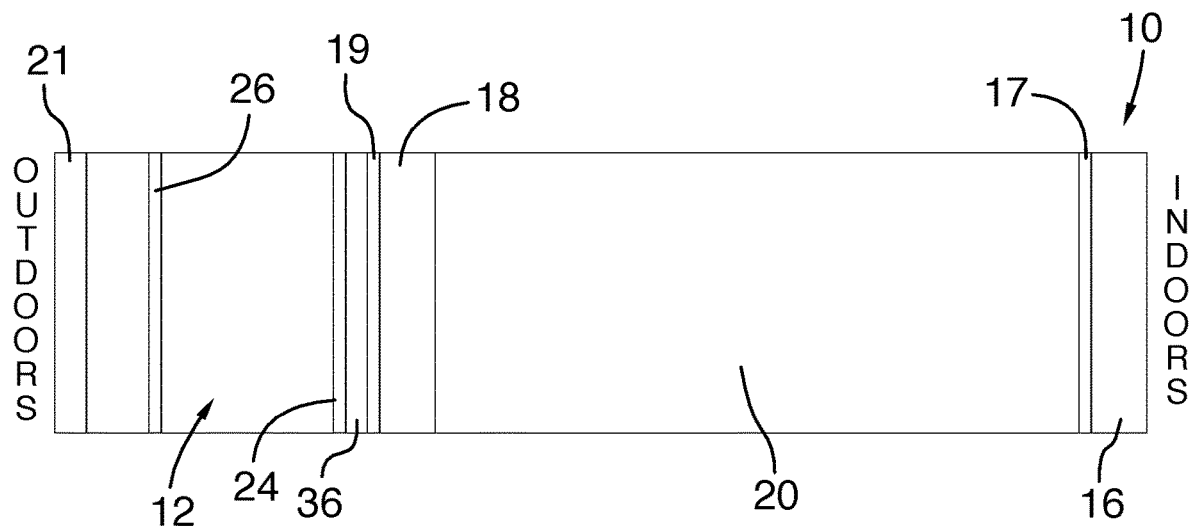
FIG. 1 is a partial enlargement of a vertical section of a finished exterior wall of a building in which an insulation panel of the present invention, laminated on both sides with perforated facers, is installed between the exterior cladding and sheathing of the finished wall and creates a rainscreen and drainage space therein.
Figure 2:
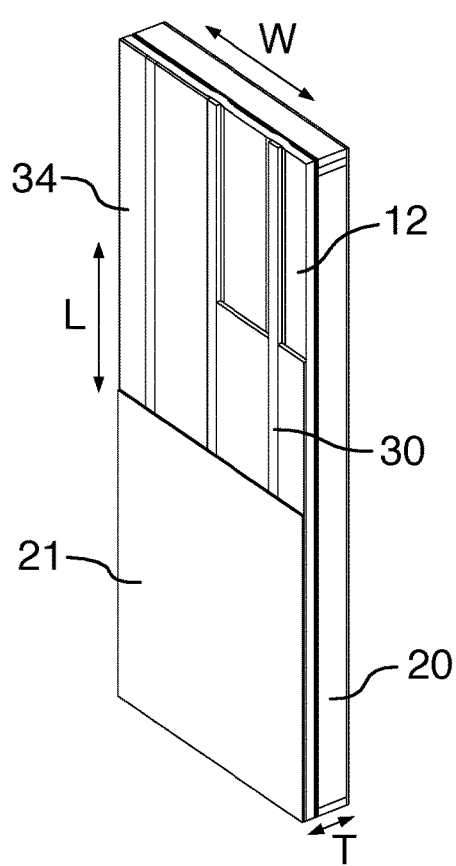
FIG. 2 is a perspective view of the finished exterior wall with partial areas of select layers cut away for illustrative purpose.

With reference to the drawings, a fully constructed exterior wall 10 of a building features rigid insulation panels 12 according to one embodiment of the present invention. In a conventional manner, the exterior wall 10 features a stud frame having vertically oriented studs 14 disposed at regular intervals in the horizontal length direction of the wall 10. Sheets or panels of drywall or other interior finishing material 16, underlaid with a suitable vapour barrier/retarder 17, are fastened to the studs 14 at the interior edges thereof that face into the interior space of the building, while sheets or panels of exterior sheathing material 18 such as plywood or oriented strand board (OSB) are fastened to the studs 14 at the exterior edges thereof that face away from the interior space of the building toward the surrounding external environment. The exterior sheathing layer 18 is externally overlaid with a water resistive barrier (WRB) 19, for example a commercially available building wrap. Interior insulation 20, for example fibreglass batt insulation, fills the cavities enclosed between the studs 14 and between the drywall 16 and exterior sheathing 18.

The rigid insulation panels 12 are installed over the sheathing 18 at the exterior side thereof that faces away from the building's interior space and outwardly toward the external environment. The finished wall 10 is completed by installation of exterior cladding 21, for example exterior siding, over the rigid insulation panels. Due to their position at the exterior side of the sheathing 20, the rigid insulation panels are also referred to herein as exterior insulation panels, as well as being referred to more generally as insulation panels.

Each insulation panel 12 has the same structure, with a foam core 22 of expanded polystyrene (EPS) or other foam material that is known to be suitable for rigid insulation panels, and interior and exterior heat-reflective facers 24, 26 applied over the entirety of the interior and exterior faces of the panel 12 that face the interior space of the building and the external environment, respectively. The heat-reflective facer 24, 26 on each face of the panel 12 reflects radiant heat energy to reduce heat transfer across the insulation panels between the interior space and the external environment, and preferably comprises a metalized polymer film.

In a known manner, the insulation panels 12 of the finished wall 10 may be mated together end-to-end in a horizontal series with a tongue-and-groove interface between each pair of adjacent insulation panels 12. To such end, and with reference to FIGS. 6A and 6B, each panel 12 features a pair of opposing vertical side edges 12A, 12B, one of which features a male tongue T jutting outward therefrom and running vertically therealong from a horizontal top edge 12C of the panel to an opposing horizontal bottom edge 12D thereof. The other side edge features a female groove G recessed thereinto and running vertically therealong, whereby the tongue of one insulation panel is insertable into the groove of the next insulation panel to mate the insulation panels together end-to-end at these vertically upright side edges.

The direction/dimension measured perpendicularly between the parallel side edges 12A, 12B of the panel is referred to herein as a width direction/dimension W of the panel, while the vertical direction/dimension measured perpendicularly between the parallel top and bottom edges 12C, 12D of the panel is referred to herein as a longitudinal direction/dimension L of the panel. A third direction/dimension of the panel denotes a thickness direction/dimension T thereof in which the interior and exterior faces of the panel are spaced apart from one another.

Figure 3:
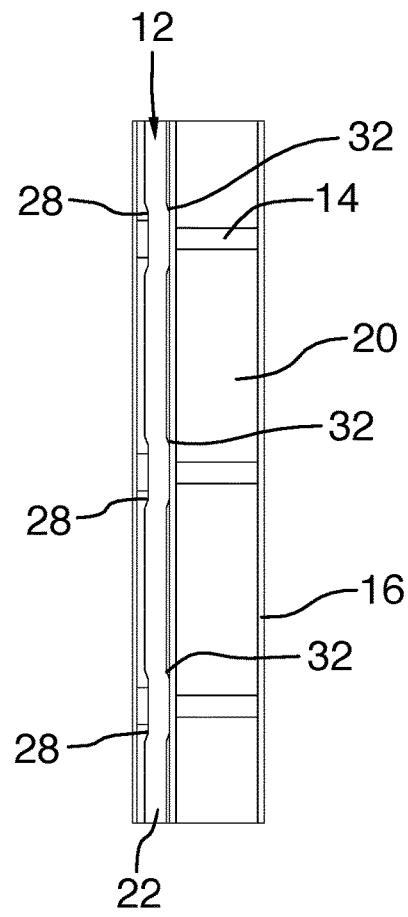
FIG. 3 is a top plan view of the finished exterior wall with a top plate thereof omitted.

At discretely and evenly spaced intervals across the width dimension W of the panel 12, a plurality of longitudinally elongated slots 28 are recessed into the exterior face of the panel. Each slot 28 spans the full longitudinal dimension of the panel from the bottom edge thereof to the opposing and parallel top edge thereof. Referring to the finished wall of FIG. 3, a respective elongated strip insert 30, for example a wooden furring strip, is received in each of the elongated slots 28 of the panel 12. In cross-sectional planes cutting horizontally through the panel 12 in parallel relation to the width direction W and perpendicular relation to the longitudinal direction L, each slot 28 has a flat-bottom cross section with a flat floor lying parallel to the two faces of the panel, and two side walls jointing this flat floor of the recessed slot to the exterior face of the panel. In the illustrated example, each slot 28 is of trapezoidal cross-section, whereby the two side walls of the slot angle outwardly in diverging fashion from the flat floor of the slot. At all areas other than the slots 20, the exterior side of the panel is of uniformly flat profile in the illustrated embodiment, though the exterior face may have other non-planar profiles between the slots so long as these profiled facial areas don't project beyond the outermost extents of the inserts 30 in the thickness direction of the panel In the same cross-sectional planes, the cross-sectional profile of each strip insert 30 has a rectangular shape with flat inner side that sits flush against the flat floor of the slot 28, and an opposing flat outer side that resides opposite and parallel to the flat inner side. The thickness of each strip insert 30 measured between the opposing inner and outer sides thereof exceeds the depth by which the respective slot 28 is recessed into the insulation panel, which in the illustrated embodiment is the distance measured from the flat bottom of the slot 28 to the plane of the uniformly flat exterior face of the panel 12. Accordingly, the strip insert 30 protrudes outwardly from the slot 28 in the thickness direction T of the panel 12, thus placing the outer side of the strip insert outwardly beyond the plane of the panel's exterior face.

On the interior side of the panel 12 opposite the slotted exterior side thereof, the interior face of the panel is also planar in the illustrated example, and spans a majority of the panel's surface area between the four perimeter edges, just like the exterior face of the panel 12 on the slotted exterior side thereof. However, instead of periodically being interrupted by longitudinal slots 28, the interior face is instead periodically interrupted by raised longitudinal ribs 32 at the same regularly spaced intervals across the width of the panel as the slots 28 on the exterior side. Each rib 32 thus aligns with a respective one of the slots 28, and as shown, may have a generally equal width to the respective slot. Each rib may span the full longitudinal dimension of the panel between the top and bottom edges, and may have a trapezoidal profile in the widthwise cross-sectional planes described above, similar the optionally trapezoidal slots 28 in the exterior side of the panel 12. The trapezoidal profile of each rib 32 narrows in its direction of protrusion from the interior face of the panel. The center-to-center distance between each adjacent pair of slots 28, and the equal center-to-center distance between each adjacent pair of ribs 32, is preferably equal to a standardized wall stud spacing interval, e.g. 16-inches or 24-inches.

In the finished wall assembly of a building's exterior envelope, the ribbed interior side of the insulation panel faces inwardly of the building toward the interior space thereof, and resides against the sheathing layer 18 in a position aligning the ribs 32 with the studs 14 of the underlying stud frame layer of the wall structure. The slots and strip inserts 30 on the opposing exterior side of the insulation panel serve as a visual marker of where the wall studs 14 reside behind the insulation panel 12 so that the exterior cladding layer 21 on the exterior side of the insulation panel 12 can be fastened to the studs 14 through the strip inserts 30 and the aligned ribs 32 of the insulation panel.

Figure 4:
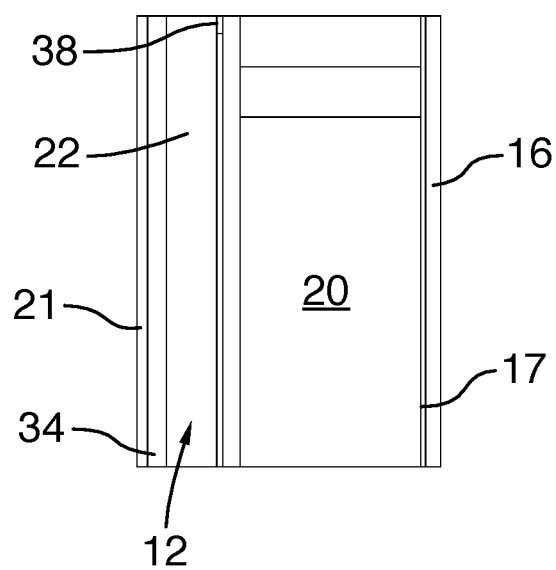
FIG. 4 is a partial vertical section of the finished exterior wall at a top end thereof.
Figure 5:
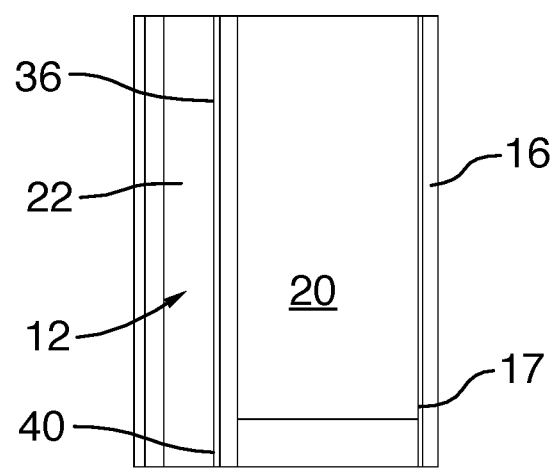
FIG. 5 is a partial vertical section of the finished exterior wall at a bottom end thereof.

The protrusion of the strip inserts 30 from the exterior face of the insulation panel acts to space the subsequently installed exterior cladding 21 outwardly off of the exterior face of the insulation panel 12 to create a rainscreen air cavity 34 therebetween. Similarly, on the interior side of the insulation panel, the ribs 32 abutted against the externally wrapped sheathing layer 18 of the wall assembly leaves a drainage space 36 between the water-resistant barrier 19 and the insulation panel 12 at the areas between the ribs 32. This spaced relationship between the water-resistant barrier 19 and the heat-reflective facer 24 on this interior side of the insulation panel forms an effective drainage plane on the interior side of the insulation opposite the rainscreen. The drainage space is preferably closed off at the top end thereof, as denoted by closure 38 in FIG. 4, to prevent circulating air currents, and open at the bottom end, as denoted by drainage opening 40 in FIG. 5.

Figure 6A:
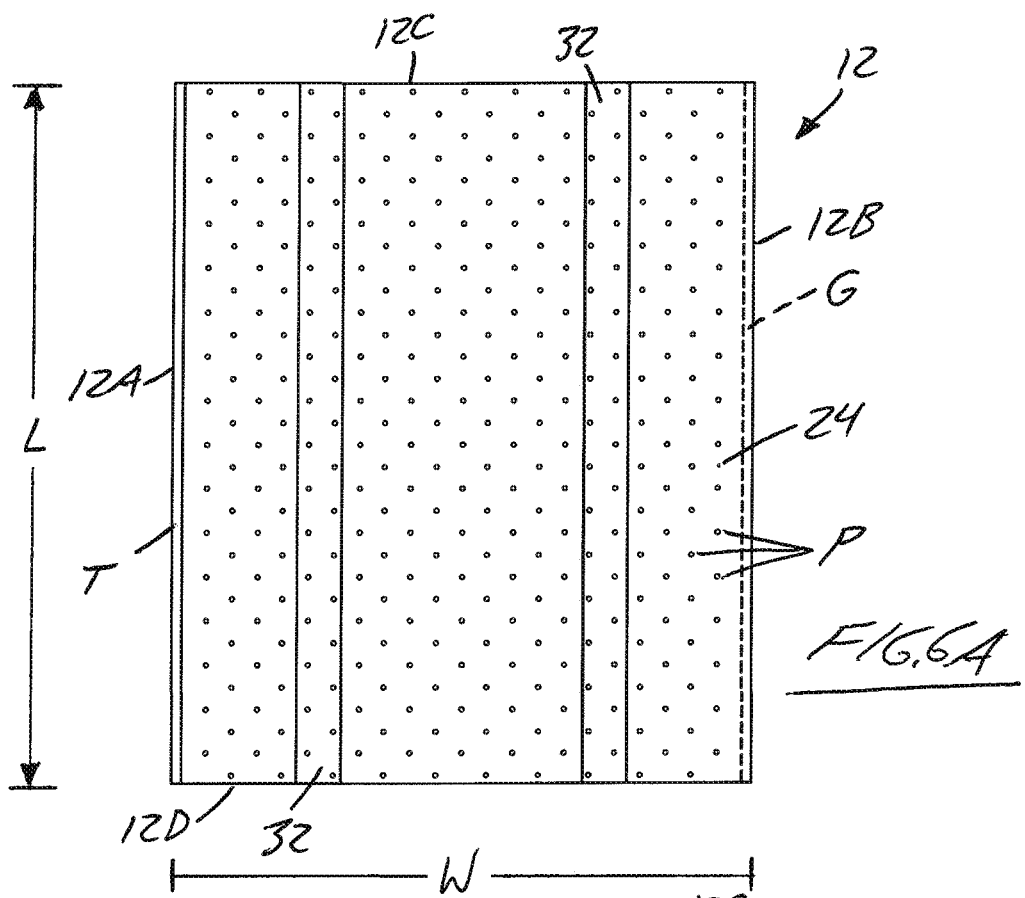
FIG. 6A is an elevational view of one of the insulation panels from the finished exterior wall of the preceding figures, as seen from an interior side of the panel and showing a perforated facer on said interior side, with the size and spacing of the perforations being illustrated at exaggerated scale for the purpose of visibility.
Figure 6B:
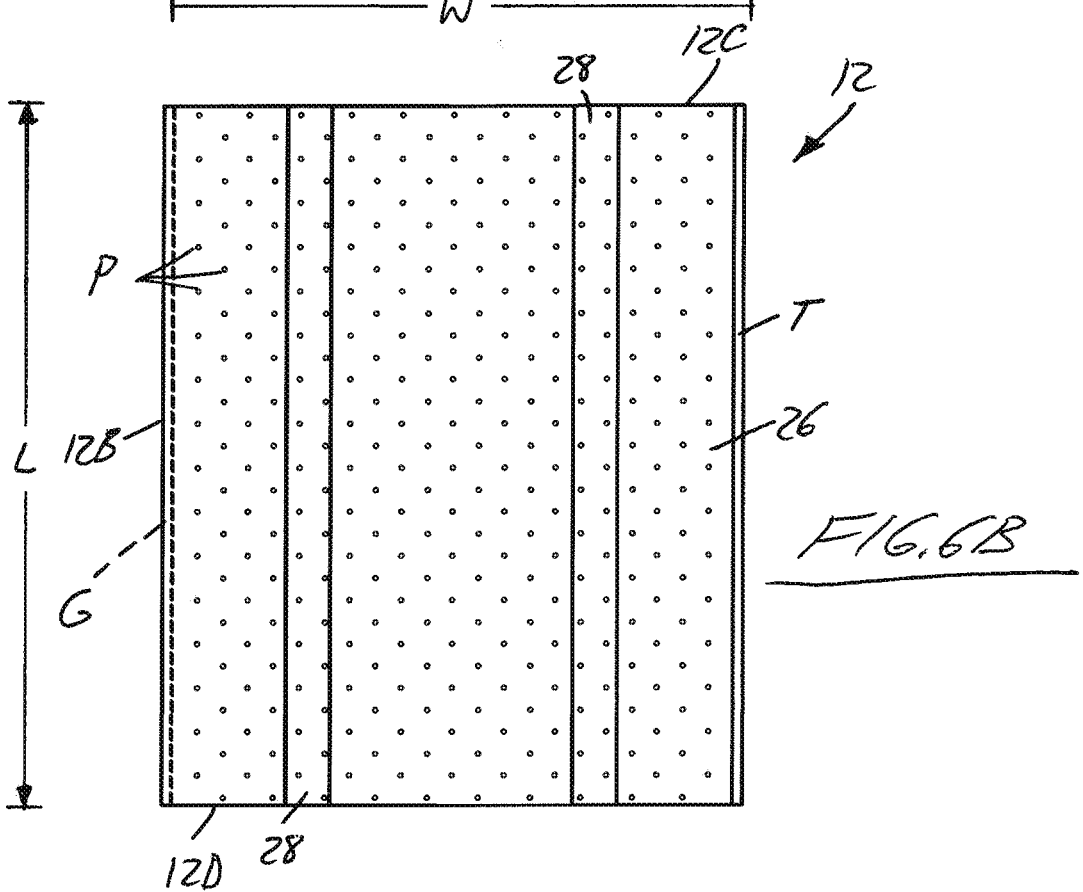
FIG. 6B is another elevation view of the insulation panel of FIG. 6A, but from an opposing exterior side thereof, and showing another perforated facer on said exterior side, with the perforation size and spacing again shown at exaggerated scale.

Each heat-reflective facer 24, 26, rather than being a uniformly intact and continuous span of material over the entire surface area thereof, is instead a perforated sheet of metalized polymer film having small pore-like holes or openings therein to increase the vapour permeability of the facer. These pore-like holes or openings are referred to herein as perforations P and are schematically shown in FIGS. 6A and 6B. These perforations enable some moisture to migrate into the foam core 22 of the panel when excessive moisture conditions exist in the rainscreen air cavity and/or drainage space at levels inadequately overcome by drainage and evaporation rates alone. Once the environmental conditions have relaxed from such moisture-rich states, the foam can dry out via its exposure through the perforations P to air in the drainage space and/or rainscreen cavity. Through the use of these perforated facers, a novel approach to moisture management may be achieved, where the foam core of the insulation panel may be useful as a temporary moisture store when environmental conditions are at particularly elevated moisture levels. The perforation-exposed foam of the insulation panel is thus used to increase the moisture management capabilities wall structure beyond the normal limitations of the air cavity and drainage space.

In the illustrated embodiment, each heat-reflective facer 24, 26 defines the outermost layer of the insulation panel on the respective side thereof, and therefore is not overlaid by a breathable membrane or any other additional layer. In the event that any additional layer is imposed over the perforated heat-reflective facer, it must not only be breathable, but also moisture penetrable, for example by also being perforated, so as not to destroy the novel function of the perforated facer. Any of the temporarily stored moisture released from the panel's foam core 22 into the drainage space behind the insulation panel 12 is prevented from migrating into the stud cavities of the wall assembly by the water resistive barrier 19 wrapped over the exterior sheathing 18 of the wall.

The perforated holes P in the heat-reflective facers are preferably no greater than ⅛-inch in diameter, and more preferably no greater than 1/16-inch in diameter in some embodiments; preferably no less than 1/64-inch in some embodiments, and more particularly between 1/64-inch and 1/32-inch in diameter, inclusive, in select preferred embodiments. The perforated holes P occupy no more than 3% of the overall area of each facer in some embodiments, no more than 2% in other particular embodiments, no less than 0.5% in some embodiments, between 0.5% and 2% in some particular embodiments, and more particularly between 0.75 and 1.5% in other embodiments. In one particular embodiment subjected to simulation testing in a computer model of the illustrated wall assembly, the perforated holes P measured 0.027-inch in diameter, and occupied 1% of the overall area of each facer. Applicant's Provisional Application 62/795,465, filed Jan. 22, 2019, included an appended report summarizing the results of three simulations performed on the computer model, and the entirety of the report is incorporated herein by reference.

FIGS. 7A and 7B illustrate further computer modeled test results, in which sheathing moisture content is plotted over a one-year period, in which the inventive insulation panels with the perforated spacers were found to outperform EPS insulation panels with unperforated facers and facerless XPS (extruded polystyrene) insulation panels.

It will be appreciated that while the illustrated embodiment particularly uses furring strips or other inserts placed in longitudinal slots in the exterior side of the insulation panel to create the rainscreen air cavities between the insulation panel and exterior cladding, and uses aligned ribs on the opposing interior side of the insulation panel to create the drainage space between the insulation panel and exterior sheathing, it will be appreciated that alternate means for achieving and maintaining the stand-off spacing and resulting air spaces between these components may be employed without detriment to the novel and inventive inclusion of the perforated facers that cooperatively interact with the air spaces to improve the overall moisture handling performance of the insulation panel and resulting wall structure.

It will also be appreciated that the while the illustrated embodiment employs the inventive insulation panels in a wall assembly, the inventive insulation panels with perforated spacers one or both sides thereof may likewise be used in other parts of a building envelope, for example within an insulated roof assembly, to similar advantage and benefit, for example in the roof assembly disclosed in Applicant's Provisional Application No. 62/931,718, filed Nov. 6, 2019, the entirety of which is incorporated herein by reference. Also, while the illustrated embodiment has the strip inserts 30 placed externally of the insulation panel, other embodiments may have the strip inserts embedded within the insulation panel, for example recessed into the surface of the foam core and covered/secured by application of the perforated facer overtop of the strip's embedded position in the foam core during manufacture of the panel.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A system, comprising:
   an exterior insulation panel configured to be positioned in an exterior building envelope of a building in an installed position and placed externally over a framed wall of said building envelope, the insulation panel having an interior face configured to face toward an interior space of the building in the installed position in the building envelope, an exterior face lying opposite the interior face configured to face away from the interior space of the building in the installed position in the building envelope, and a foam core laminated with a perforated interior facer at the interior face of the panel,
   wherein the exterior insulation panel is further characterized by:
   a set of raised longitudinal ribs residing at spaced intervals across the interior face, said longitudinal ribs being of raised profile relative to said interior face such that placement of said longitudinal ribs against an outer side of the framed wall of the building defines an open drainage space located between said framed wall and said exterior insulation panel at an area of the interior face between said raised longitudinal ribs;
   perforations in the perforated interior facer that are located at said area between said raised longitudinal ribs, and that enable, during moisture rich conditions, migration of excess moisture from said drainage space into the foam core in order to temporarily hold said additional excess moisture within the foam core until relaxation of said moisture rich conditions; and furring strips that are partially recessed into, or embedded within, the exterior face of the insulation panel at spaced intervals thereacross in positions partially protruding from said exterior face, wherein exterior cladding is placed against said furring strips and an air cavity is delimited between the exterior cladding and the exterior face of the insulation panel and at an area of the exterior face between said furring strips, wherein the exterior insulation panel resides in the installed position placed over the framed wall with the interior face of the insulation panel facing inwardly toward said interior space of the building and said exterior face facing outwardly away from said interior space of the building, said drainage space is left open between the interior face of the insulation panel and the framed wall, and said perforations in the perforated interior facer are open to said drainage space.

2. The system of claim 1 wherein the exterior face of the insulation panel is laminated with a perforated exterior facer, and additional perforations in the perforated exterior facer enable, during said moisture rich conditions, migration of additional excess moisture from said air cavity into the foam core in order to temporarily hold said additional excess moisture within the foam core until relaxation of said moisture rich conditions.

3. The system of claim 1 wherein each longitudinal rib aligns with a respective one of the furring strips.

4. The system of claim 1 wherein the perforated interior facer comprises a metalized polymer film.

5. The system of claim 1 wherein the perforated interior facer has an average perforation diameter of no more than 1/8-inch.

6. The system of claim 1 wherein the perforated interior facer has an average perforation diameter of no less than 1/64-inch.

7. The system of claim 1 wherein the perforated interior facer has an average perforation diameter of between 1/64-inch and 1/16-inch, inclusive.

8. The system of claim 1 wherein a perforated area of the perforated interior facer is no more than 3% of a total overall area of said interior facer.

9. The system of claim 1 wherein a perforated area of the perforated interior facer is no more than 2% of a total overall area of said interior facer.

10. The system of claim 1 wherein a perforated area of the perforated interior facer is between 0.5% and 2% of a total overall area of said interior facer.

11. The system of claim 1 wherein a perforated area of the perforated interior facer is approximately 1% of a total overall area of said interior facer.

12. The system of claim 1 wherein the exterior face of the insulation panel includes a perforated exterior facer that has additional perforations therein that enable, during said moisture rich conditions, migration of additional excess moisture from said air cavity into the foam core in order to temporarily hold said additional excess moisture within the foam core until relaxation of said moisture rich conditions.

13. The system of claim 12 wherein the exterior face of the insulation panel that includes the perforated exterior facer is laminated.

14. A method of using the system of claim 1 in a finished building envelope, said method comprising, during moisture-rich environmental conditions, using said perforations in the perforated interior facer to admit migration of said excess moisture from said drainage space of the finished building envelope into the foam core for temporary holding of said migrated moisture within said foam core.

15. The method of claim 14 further comprising later releasing said migrated moisture from the foam core once the moisture-rich environmental conditions have relented.

* * * * *